(12) United States Patent
Dhere

(10) Patent No.: US 8,792,437 B2
(45) Date of Patent: Jul. 29, 2014

(54) SYNCHRONIZED USE OF A WIRELESS CHANNEL BY MULTIPLE APPLICATIONS

(75) Inventor: Atul Shivaji Dhere, Hyderabad (IN)

(73) Assignee: Qualcomm Incorporated, San Diego, CA (US)

(*) Notice: Subject to any disclaimer, the term of this patent is extended or adjusted under 35 U.S.C. 154(b) by 184 days.

(21) Appl. No.: 13/205,098

(22) Filed: Aug. 8, 2011

(65) Prior Publication Data

US 2013/0039282 A1    Feb. 14, 2013

(51) Int. Cl.
*H04W 4/00*    (2009.01)

(52) U.S. Cl.
USPC .......................................... 370/329; 455/450

(58) Field of Classification Search
USPC .................................. 370/310, 329
See application file for complete search history.

(56) References Cited

U.S. PATENT DOCUMENTS

| | | | |
|---|---|---|---|
| 6,993,342 B2* | 1/2006 | Kuchibhotla et al. ......... | 455/450 |
| 2003/0100310 A1 | 5/2003 | Lindner et al. | |
| 2005/0198302 A1 | 9/2005 | Ewanchuk et al. | |
| 2006/0262719 A1 | 11/2006 | Cao et al. | |
| 2009/0135749 A1* | 5/2009 | Yang ............................. | 370/310 |
| 2010/0118752 A1 | 5/2010 | Suzuki et al. | |
| 2011/0058523 A1 | 3/2011 | Manning et al. | |
| 2011/0090794 A1 | 4/2011 | Cherian et al. | |
| 2011/0124294 A1* | 5/2011 | Dwyer et al. ............... | 455/67.11 |
| 2011/0131321 A1* | 6/2011 | Black et al. .................... | 709/224 |
| 2012/0005276 A1* | 1/2012 | Guo et al. ...................... | 709/206 |
| 2012/0271822 A1* | 10/2012 | Schwendimann et al. .... | 707/736 |

OTHER PUBLICATIONS

ETSI TS 125 331 v9.5.0; "Universal Mobile Telecommunications System (UMTS); Radio Resource Control (RRC)", 3GPP TS 25.331 version 9.5.0 Release 9 (Mar. 2011).
Qian et al., "TOP: Tail Optimization Protocol for Cellular Radio Resource Allocation," 18th IEEE International Conference on Network Protocols (ICNP), 2010, pp. 285-294, Doi: 10.1109/ICNP.2010.5762777.
International Search Report and Written Opinion—PCT/US2012/049854—ISA/EPO—Oct. 30, 2012.

* cited by examiner

*Primary Examiner* — Anh-Vu Ly
*Assistant Examiner* — Hashim Bhatti
(74) *Attorney, Agent, or Firm* — S. Hossain Beladi

(57) ABSTRACT

A method includes allocating a first channel of a wireless communication device. The first channel is allocated in response to a request for a channel to be used by a first application executing at the wireless communication device. The method also includes preventing establishment of a second channel for a second application executing at the wireless communication device by indicating to the second application, from a modem of the wireless communication device, that the allocated first channel is to be used by or is available for use by the second application. For example, the second channel may not be established for the second application at a later point in time because the second application may instead complete data transfer operations via the allocated first channel at an earlier point in time.

23 Claims, 7 Drawing Sheets

SYNCHRONIZED USE OF A WIRELESS CHANNEL BY MULTIPLE APPLICATIONS

BACKGROUND

1. Field

The present disclosure relates to wireless communication systems and applications executable on a wireless communication device.

2. Background

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Many such wireless telephones incorporate additional devices to provide enhanced functionality for end users. For example, a wireless telephone can also include a digital still camera, a digital video camera, a digital recorder, and an audio file player. Also, such wireless telephones can execute software applications, such as a web browser application that can be used to access the Internet. As such, these wireless telephones can include significant computing capabilities.

Wireless telephones (e.g., smartphones) are increasingly being used for applications other than voice calling. Such applications may periodically check for data updates. When an application requests Internet connectivity (e.g., to check for data updates), the phone may set up a data channel between the phone and the network. During this process, one or more packet data protocol (PDP) contexts may also be established for the phone (e.g., a PDP context may be established for each application or application class). Setting up the data channel may involve signaling between the phone and the network and may consume battery resources at the smartphone.

SUMMARY

This disclosure implements a synchronized relationship between various applications executing at a wireless phone (e.g., a smartphone). When the phone has allocated a first channel for a first application (e.g., an e-mail client, a social networking client, a calendar application, a news feed reader, etc.) executing at the phone, a second application executing at the phone may be notified of the allocated first channel. Based on this notification, the second application may elect to engage in synchronized use of the first channel to perform its own data update via the first channel, which may prevent subsequent allocation of a second channel for the second application. The second application may have registered with a data services layer of modem software in the phone to receive such notifications. In deciding whether or not to engage in synchronized use of the first channel, the second application may consider factors including whether or not its next scheduled data update is within a threshold amount of time (e.g., five minutes).

For example, if five applications are scheduled to perform data synchronization operations one minute after the other, the proposed system may enable all five applications to complete the operations using a single data channel. Setting up a single channel may consume less battery and signaling resources than setting up five channels (i.e., one channel for each application). Since multiple applications may elect to use a single channel, buffer occupancy associated with the channel may be increased, resulting in the network increasing the bandwidth of the allocated channel. For example, instead of allocating a 64/384 Kbps (upstream/downstream) channel five times, the network may allocate a 1.8/3.6 Mbps channel once.

In a particular embodiment, a method includes allocating a first channel in a wireless communication device. The first channel is allocated in response to a request for a channel to be used by a first application executing at the wireless communication device. The method also includes preventing establishment of a second channel for a second application executing at the wireless communication device by indicating to the second application, from a modem of the wireless communication device, that the allocated first channel is to be used by the second application. For example, the second channel may not be established for the second application at a later point in time because the second application may instead complete data transfer operations via the allocated first channel at an earlier point in time.

In another particular embodiment, a wireless communication device includes an application processor configured to execute at least a first application and a second application. The wireless communication device also includes a modem processor configured to allocate a first channel in response to a request for a channel to be used by the first application. The modem processor is further configured to prevent establishment of a second channel for the second application by indicating to the second application that the allocated first channel is to be used by the second application. For example, the second channel may not be established for the second application at a later point in time because the second application may instead complete data transfer operations via the allocated first channel at an earlier point in time.

In another particular embodiment, a wireless communication device includes means for executing a first application and means for executing a second application. The wireless communication device also includes means for allocating a first channel in response to a first channel request for a channel to be used by the first application. The wireless communication device further includes means for preventing establishment of a second channel for the second application. The means for preventing includes means for indicating to the second application that the allocated first channel is to be used by the second application. For example, the second channel may not be established for the second application at a later point in time because the second application may instead complete data transfer operations via the allocated first channel at an earlier point in time.

In another particular embodiment, a non-transitory processor-readable medium includes instructions that, when executed by a processor, cause the processor to receive, at a second application executing at a wireless communication device, an indication that a first channel allocated for a first application executing at the wireless communication device is to be used by the second application. The instructions are also executable to cause the processor to transmit a channel request to the modem from the second application in response to determining to perform synchronized use of the first channel. The instructions are further executable to cause the processor to perform, at the second application, synchronized use of the first channel with the first application without establishment of a second channel for the second application. By performing synchronized use of the first channel with the first application at an earlier point in time, the second application may prevent establishment of a second channel for the second application at a later point in time.

One particular advantage provided by at least one of the disclosed embodiments is giving individual applications control over whether or not to engage in synchronized use of an allocated channel. When multiple applications at a mobile device use a single channel instead of requesting individual channel allocations, fewer battery and signaling resources may be consumed by the wireless device.

Other aspects, advantages, and features of the present disclosure will become apparent after review of the entire application, including the following sections: Brief Description of the Drawings, Detailed Description, and the Claims.

DETAILED DESCRIPTION

Figure 1:
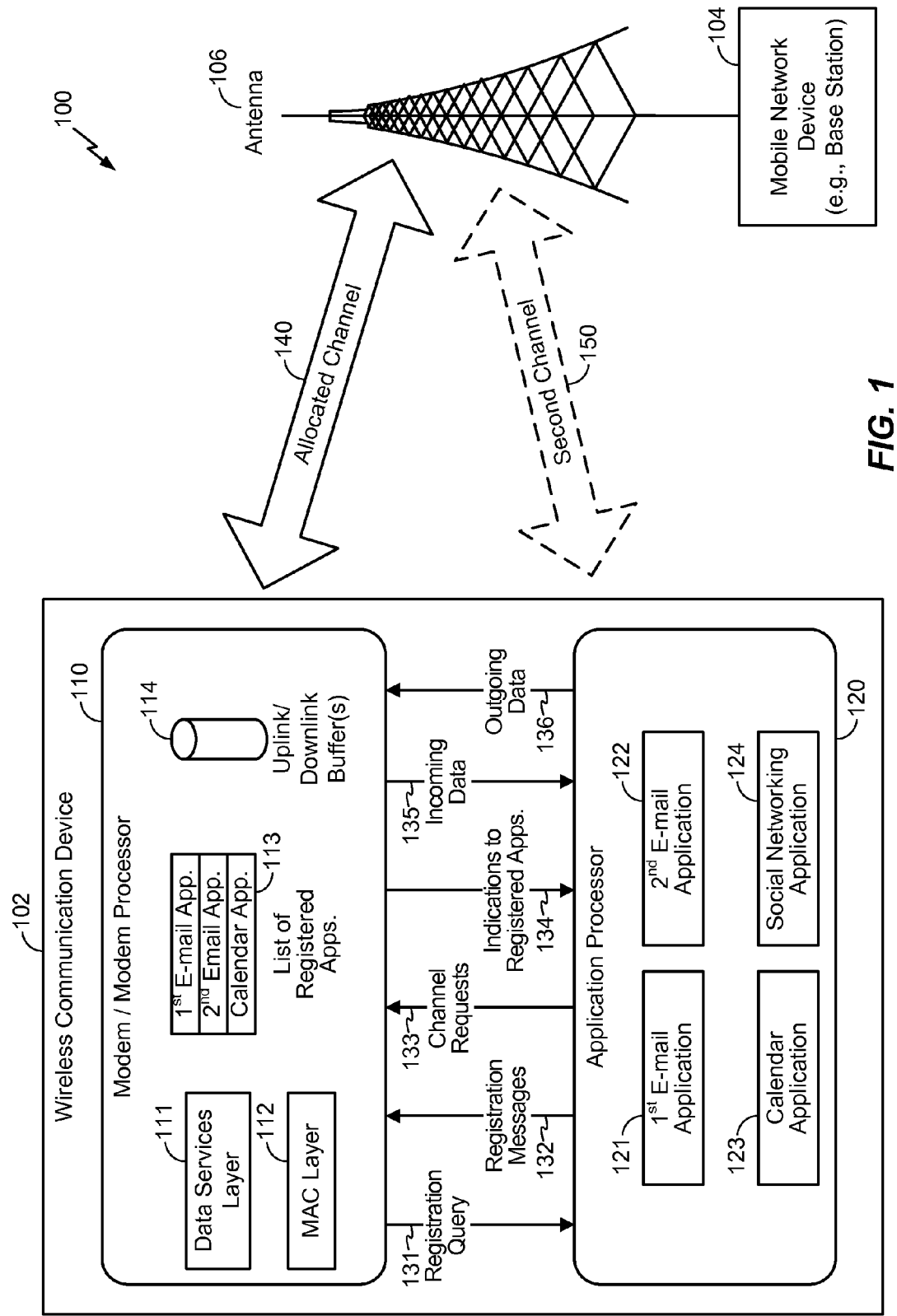
FIG. 1 is a diagram to illustrate a particular embodiment of a system to enable synchronized use of a wireless channel.

Referring to FIG. 1, a particular illustrative embodiment of a system 100 to enable synchronized use of a wireless channel at a wireless communication device 102 is disclosed. The wireless communication device 102 may be in communication with one or more devices corresponding to one or more mobile networks. For example, as illustrated in FIG. 1, the wireless communication device 102 may be in communication with a base station 104 via an antenna 106. In an illustrative embodiment, the wireless communication device 102 may include a mobile phone, a smartphone, a laptop computer, a tablet computer, a personal digital assistant (PDA), a portable media player, another portable electronic device operable to perform wireless communication, or any combination thereof.

The wireless communication device 102 may include one or more circuits, processors (e.g., digital signal processors and/or microprocessors), software instructions executable by such processors, or any combination thereof, to implement various functions of the wireless communication device 102. For example, as illustrated in FIG. 1, the wireless communication device 102 may include a modem processor (or modem) 110 and an application processor 120. In a particular embodiment, the modem processor 110 and the application processor 120 are distinct hardware microprocessors. Alternatively, the modem processor 110 and the application processor 120 may be distinct logical processors sharing a common underlying hardware microprocessor.

The application processor 120 may execute one or more applications at the wireless communication device 102, such as e-mail applications, social networking applications, news feed readers, calendar applications, and other applications. For example, the application processor 120 may execute a first e-mail application 121, a second e-mail application 122, a calendar application 123, and a social networking application 124. The applications 121-124 may be executed concurrently (e.g., via one or more threads at an interleaved multi-threaded processor, via multiple processors, or via serial execution including context switching between applications). In a particular embodiment, one or more of the applications 121-124 are background applications that are typically "inactive" at the wireless communication device 102 except during scheduled automatic data synchronization operations (e.g., to send and receive e-mail from an e-mail server) and manual user activations (e.g., to read newly received mail or to compose outgoing mail).

The modem processor 110 may include, execute, or implement a data services layer 111, a media access control (MAC) layer 112, and one or more uplink and/or downlink buffers 114. In a particular embodiment, the data services layer 111 is operable to facilitate communication between the modem processor 110 and the application processor 120 (e.g., via inter-processor communication messages). The MAC layer 112 may multiplex data from the applications 121-124 onto wireless channels (e.g., via uplink buffer(s) 114) and may de-multiplex data from wireless channels (e.g., via the downlink buffer(s) 114) to the applications 121-124.

The modem processor 110 may also include or maintain a list 113 of applications that have registered for channel allocation notifications. When a channel 140 is allocated for use by any of the applications 121-124 executing at the application processor 120, the modem processor 110 may transmit an indication regarding the allocated channel 140 to each registered application in the list 113.

During operation, the data services layer 111 may (e.g., upon powering on of the wireless communication device 102) transmit a registration query message 131 to the applications 121-124. The applications 121-124 may be executing at the application processor 120. For example, execution of the applications 121-124 may include executing commands or operations associated with data synchronization operations of the applications 121-124. In response to the registration query message 131, one or more of the applications 121-124 may transmit (or initiate) registration messages 132 to the data services layer 111. In the example of FIG. 1, the first e-mail application 121, the second e-mail application 122, and the calendar application 123 are shown to have transmitted registration messages 132 and have thus been added to the list 113 of registered applications.

Subsequent to the registration of the applications 121-123, a particular application, such as the first e-mail application 121, may transmit a channel request 133 to the data services layer 111 of the modem processor 110. For example, the first e-mail application 121 may transmit the channel request 133 during or in preparation for performing a background data synchronization operation (e.g., checking for new e-mail). Prior to receipt of the channel request 133, the modem processor 110 may be in a universal mobile telecommunications system (UMTS) low-power state, such as an IDLE state or a paging channel (PCH) state.

In response to the channel request 133, the modem processor 110 may exchange signaling messages with the base station 104 and the channel 140 may be allocated for use by the first e-mail application 121. Generally, the channel 140 may be considered as "allocated for use" when the channel 140 has been established and is ready to receive downlink data and/or send uplink data. Thus, although FIG. 1 depicts the single allocated channel 140, the allocated channel 140 may include multiple underlying physical, logical, and transport channels that are uplink-only, downlink-only, or both uplink and downlink. In a particular embodiment, the physical, logical, and transport channels may be UMTS channels. While the channel 140 is allocated, the modem processor 110 may be in a high-power state, such as a forward access channel (FACH) state or a dedicated channel (DCH) state.

In response to the allocation of the channel 140, the data services layer 111 may transmit indications 134 to registered applications regarding the allocated channel 140. For example, the data services layer 111 may transmit the indications 134 to the second e-mail application 122 and the calendar application 123. The indications 134 may be indications that the channel 140 to be used by the first e-mail application 140 is also to be used (or available for use) by the second e-mail application 122 and the calendar application 123.

In response to the indications 134, the second e-mail application 122 and the calendar application 123 may each determine whether or not to engage in synchronized use of the allocated channel 140 with the first e-mail application 121 (which may at this point already be receiving incoming data 135 and transmitting outgoing data 136 via the allocated channel 140). For example, the second e-mail application 122 may determine not to perform synchronized use of the allocated channel 140, but the calendar application 123 may determine to perform synchronized use of the allocated channel 140 (i.e., "share" the allocated channel 140). An illustrative example of determining whether or not to perform synchronized use of a channel is further described with reference to FIG. 2. In a particular embodiment, to signal an intent to perform synchronized use of the allocated channel 140, the calendar application 123 may transmit a second channel request 133 to the data services layer 111. Thus, the indication 134 may be transmitted to the calendar application 123 prior to the second channel request 133 being received by the data services layer 111.

In response to the second channel request 133, the buffer occupancy of the allocated channel 140 may be increased (e.g., by increasing the size of the associated device-side buffers 114 and/or network-side buffers (not shown)), so that incoming data 135 and outgoing data 136 corresponding to both the first e-mail application 121 and the calendar application 123 may be transmitted via the single allocated channel 140. After both the first e-mail application 121 and the calendar application 123 have completed communications, the allocated channel 140 may be released. After the release of the allocated channel 140, the modem processor 110 may return to a low-power state, such as the IDLE state or the PCH state.

Synchronized use of the allocated channel 140 may thus prevent establishment of a second channel 150 for the calendar application 123. For example, the second channel 150 may not be established for the calendar application 123 at a later point in time because the calendar application 123 may instead complete data transfer operations via the allocated channel 140 at an earlier point in time. Additional applications may also perform synchronized use of the allocated channel 140. For example, when five applications simultaneously use the channel 140, instead of allocating a 64/384 Kbps (upstream/downstream) channel five times (i.e., to create and configure five separate channels), a network may allocate a 1.8/3.6 Mbps channel once. This may reduce signal/control messaging corresponding to channel allocation and deallocation between the wireless communication device 102 and the base station 104 by a factor of four. Moreover, reduced battery resources may be consumed at the wireless communication device 102, since fewer channels are allocated.

Figure 2:
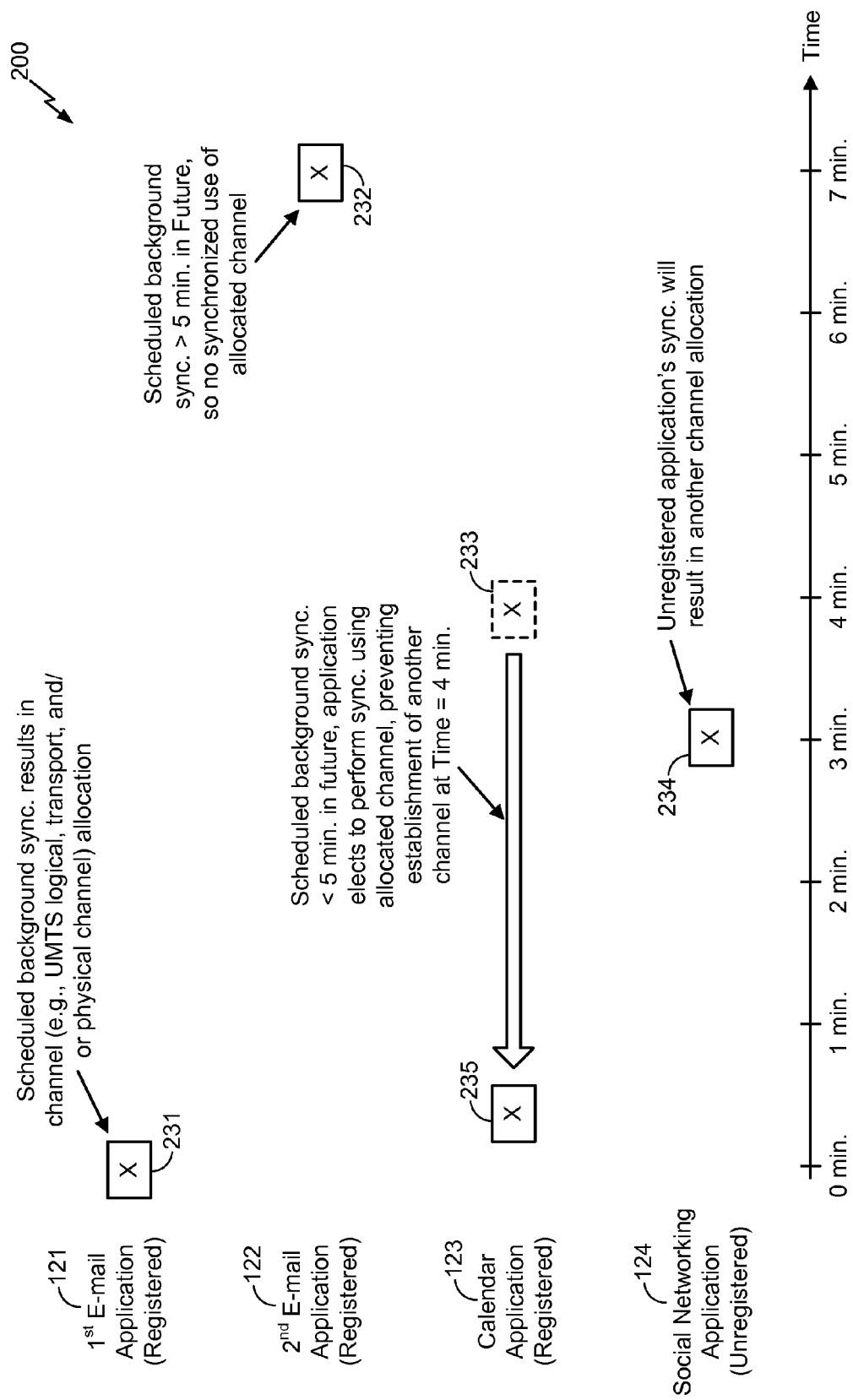
FIG. 2 illustrates a timeline of operations performed by the applications executing at the wireless communication device of FIG. 1.

FIG. 2 illustrates a timeline of operations performed by the applications 121-124 executing at the wireless communication device 102 of FIG. 1. As illustrated in FIG. 2, the first e-mail application 121, the second e-mail application 122, and the calendar application 123 may be registered for a channel allocation notification service, but the social networking application 124 may not be registered for the channel allocation notification service.

At a time T=0 minutes, the first e-mail application 121 may initiate a first scheduled background synchronization operation, as indicated at 231. This operation may result in allocation of one or more UMTS logical, transport, and/or physical channels (e.g., the allocated channel 140 of FIG. 1). In response to the channel allocation(s), other registered applications, such as the second e-mail application 122 and the calendar application 123 may be notified. However, the unregistered social networking application 124 may not be notified.

In a particular embodiment, each notified application 122, 123 may determine whether or not to perform synchronized use of the channel allocated for the first e-mail application 121. The notified applications 122, 123 may consider application-specific factors as well as common device-specific factors in making the determination. Thus, application developers may be provided the option to "opt into" notifications regarding allocated channels and whether or not to perform synchronized use of a wireless channel with at least one other application. In a particular embodiment, the factors considered by a notified application may include whether or not the notified application has a scheduled synchronization operation within a defined time period. In the example of FIG. 2, the defined time period is illustrated as 5 minutes. However, it should be noted that other time periods may also be used, and each application may use the same defined time period or a different defined time period.

When a notified application determines that it does not have a scheduled synchronized operation within the defined time period, the notified application may decline to perform synchronized use of the allocated channel. For example, as indicated at 232, the second e-mail application 122 has a scheduled synchronization operation at a time T=7 minutes, which is more than 5 minutes from the time T=0 minutes. Thus, the second e-mail application 122 may decline to perform synchronized use of the channel allocated for the first e-mail application 121.

When a notified application determines that it does have a scheduled synchronization operation within the defined time period, the notified application may elect to perform synchronized use of the allocated channel. For example, as indicated at 233, the calendar application 123 has a second scheduled synchronization operation at a time T=4 minutes, which is within the 5 minute time period. In response, the calendar application 123 may transmit a channel request prior to its regular scheduled synchronization operation. The calendar application 123 may perform its synchronization operation earlier than normal, via the channel allocated for the first e-mail application 121, as indicated at 235. It will be appreciated that when the calendar application 123 performs its synchronization operation earlier, establishment of another channel at the time T=4 minutes may be prevented.

It should be noted that although the social networking application 124 also has a scheduled synchronization operation (as indicated at 234) that is within the 5 minute time period (i.e., at a time T=3 minutes), allocation of a separate channel for the social networking application 124 may not be prevented because the social networking application is unregistered. In an alternate embodiment, instead of letting individual applications opt in, a wireless communication device may force applications to engage in synchronized use of a wireless channel and/or force all applications to register.

Figure 3:
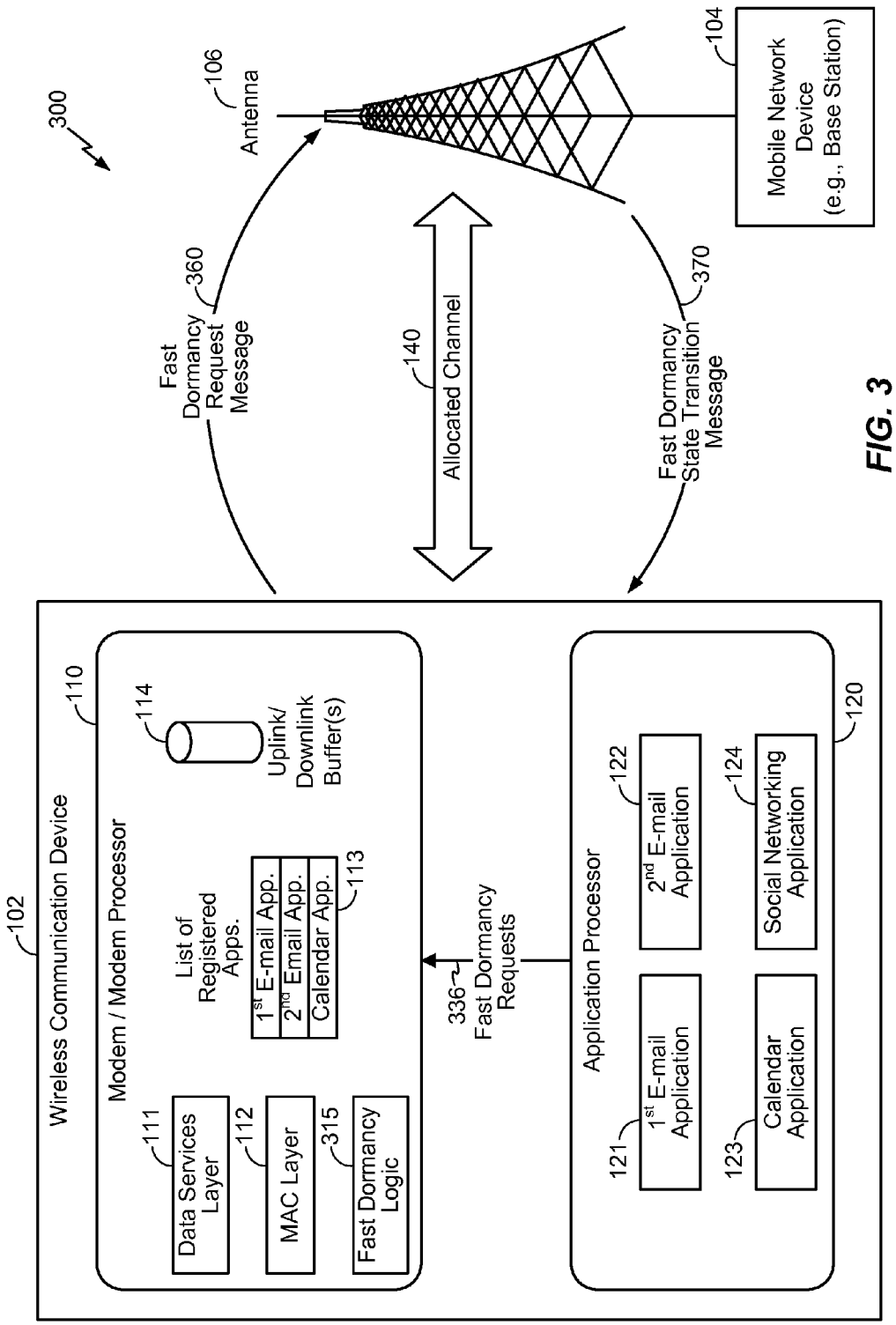
FIG. 3 is a diagram to illustrate another embodiment of the system of FIG. 1.

FIG. 3 is a diagram to illustrate another particular embodiment of the system 100 of FIG. 1 and is generally designated 300. As illustrated in FIG. 3, the wireless communication device 102 may be in communication with the base station 104 via the antenna 106.

Although not illustrated in FIG. 3, the modem processor 110 and the application processor 120 may be operable to communicate registration queries, registration messages, channel requests, indications, incoming data, and outgoing data, as described with reference to the modem processor 110 of FIG. 1 and the application processor 120 of FIG. 1. For example, the registration queries, registration messages, channel requests, indications, incoming data, and outgoing data may be communicated via inter-processor messages and may enable synchronized use of the allocated channel 140 by multiple applications, as described with reference to FIGS. 1-2.

The modem processor 110 may also include, implement, or be operable to execute instructions representing fast dormancy logic 315. The term "fast dormancy" may refer to a power-saving feature standardized in version 8 and later versions of the Radio Resource Control (RRC) technical specification (TS) 25.331, promulgated by the 3rd generation partnership project (3GPP) standard body. Generally, fast dormancy as defined in the 3GPP standard may enable a mobile device to quickly return to a low-power IDLE state (e.g., from a high-power FACH state without first transitioning into an intermediate PCH state) by requesting a connection release by the network. However, the standardized version of fast dormancy may not be effective when multiple applications can perform synchronized use of the single allocated channel 140.

For example, in accordance with the standardized version of fast dormancy, a first application that completes use of the allocated channel 140 may issue a fast dormancy request 336 and the modem processor 110 may transmit a corresponding fast dormancy request message 360 to the network. To honor the fast dormancy request message 360, the network may transmit a state transition message 370 (e.g., indicating that the wireless communication device 102 is to directly transition to the IDLE state). However, if a second application that has elected to perform synchronized use of the allocated channel 140 has not yet completed communication via the shared channel 140, the second application may be interrupted by the teardown of the channel 140 and the transition to the IDLE state. Moreover, re-establishing the channel 140 (or a new channel) and transitioning out of the IDLE state may consume battery resources and may involve numerous signaling messages between the wireless communication device 102 and the network.

To avoid such situations, the fast dormancy logic 315 may implement a modified version of fast dormancy. For example, even though a first fast dormancy request 336 associated with the allocated channel 140 is received from a first application, the fast dormancy logic 315 may refrain from requesting the network for fast dormancy of the allocated channel 140 while a second application performing synchronized use of the allocated channel 140 has not transmitted a second fast dormancy request (i.e., until other applications are done using the allocated channel 140). While synchronized use of the channel 140 is performed, the fast dormancy logic 315 may receive fast dormancy requests 336 from multiple applications and may determine whether the number of received fast dormancy requests 336 is equal to the number of applications communicating via the channel 140. When the numbers are equal (i.e., fast dormancy requests have been received from each application engaging in synchronized use of the channel), the fast dormancy logic 315 may request fast dormancy of the allocated channel 140 via the fast dormancy request message 360. Moreover, the fast dormancy request message 360 may be transmitted independently of whether packet data protocol (PDP) contexts corresponding to the applications have been released. For example, the wireless communication device 102 may transmit the fast dormancy request message 360 even if one or more PDP contexts are active, because the wireless communication device 102 has knowledge that all applications using the allocated channel 140 have ceased communication.

The system 300 of FIG. 3 may thus enable the use of fast dormancy in conjunction with synchronized use of an allocated channel, which may further reduce battery consumption at a wireless communication device and signaling congestion between the wireless communication device and a network.

Figure 4:
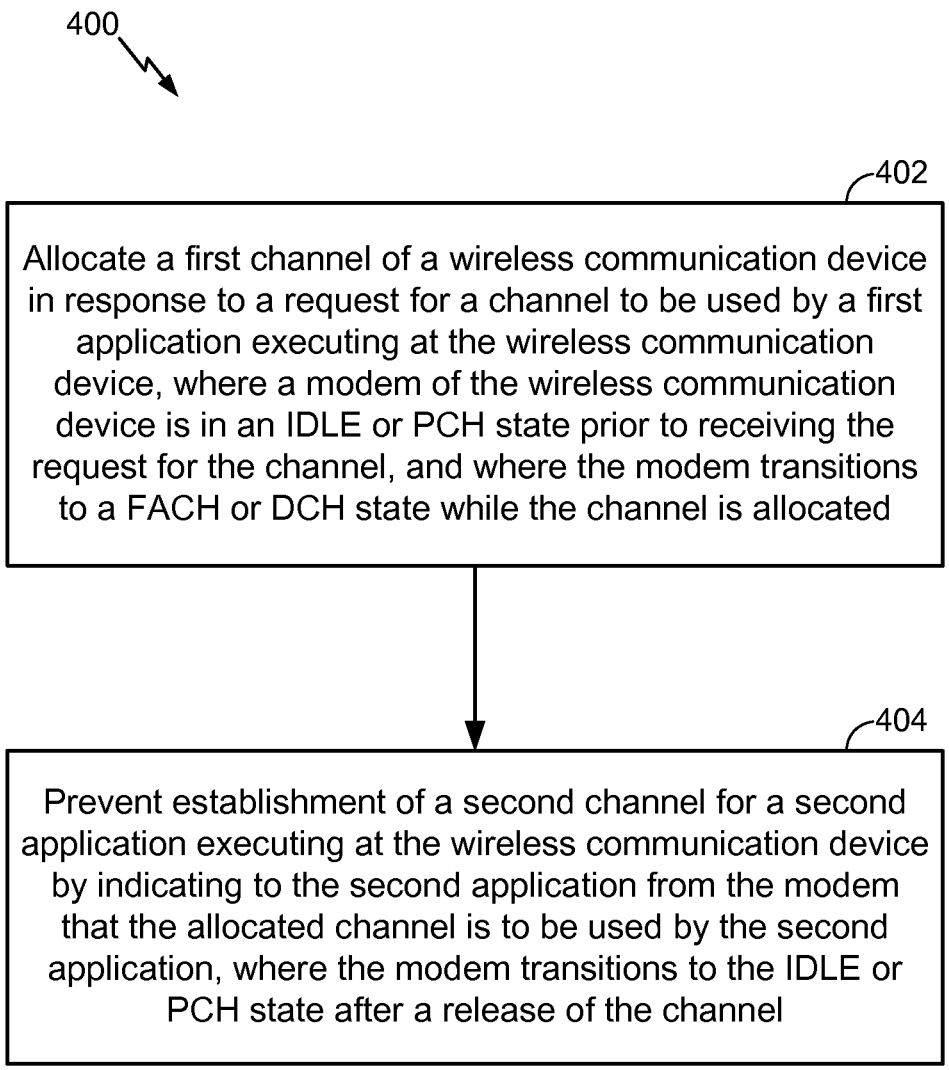
FIG. 4 is a flowchart to illustrate a particular embodiment of a method of enabling synchronized use of a wireless channel.

FIG. 4 is a flowchart to illustrate a particular embodiment of a method 400 of enabling synchronized use of a wireless channel between multiple applications executing at a wireless communication device. In an illustrative embodiment, the method 400 may be performed by the wireless communication device 102 of FIG. 1 or FIG. 3.

The method 400 may include allocating a first channel of a wireless communication device in response to a request for a channel to be used by a first application executing at the wireless communication device, at 402. A modem of the wireless communication device may be in an IDLE or PCH state prior to receiving the request for the channel and may transition to a FACH or DCH state while the channel is allocated. For example, in FIG. 1, the modem processor 110 may allocate and/or request allocation of the channel 140 in response to receiving the channel request 133 from the first e-mail application 121.

The method 400 may also include preventing establishment of a second channel for a second application executing at the wireless communication device, at 402. Establishment of the second channel may be prevented by indicating to the second application from the modem that the allocated channel is to be used by the second application. Thus, the second channel may not be established for the second application at a later point in time because the second application may instead complete data transfer operations via the allocated channel at an earlier point in time. For example, in FIG. 1, the modem processor 110 may transmit the indication 134 to the calendar application 123, and the calendar application 123 may elect to perform synchronized use of the allocated channel 140, thereby preventing establishment of the second channel 150 for the calendar application 123. The modem may transition to the IDLE or PCH state after a release of the channel (e.g., after the first application and the second application complete communications via the allocated channel).

The method 400 of FIG. 4 may thus reduce an overall number of channel allocations by enabling multiple applications to use a single allocated channel. This may reduce signal/control messaging and battery consumption at a wireless communication device.

In a particular embodiment, the method 400 of FIG. 4 may be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the method 400 of FIG. 4 can be performed by a processor that executes instructions, as described with respect to FIG. 7.

Figure 5:
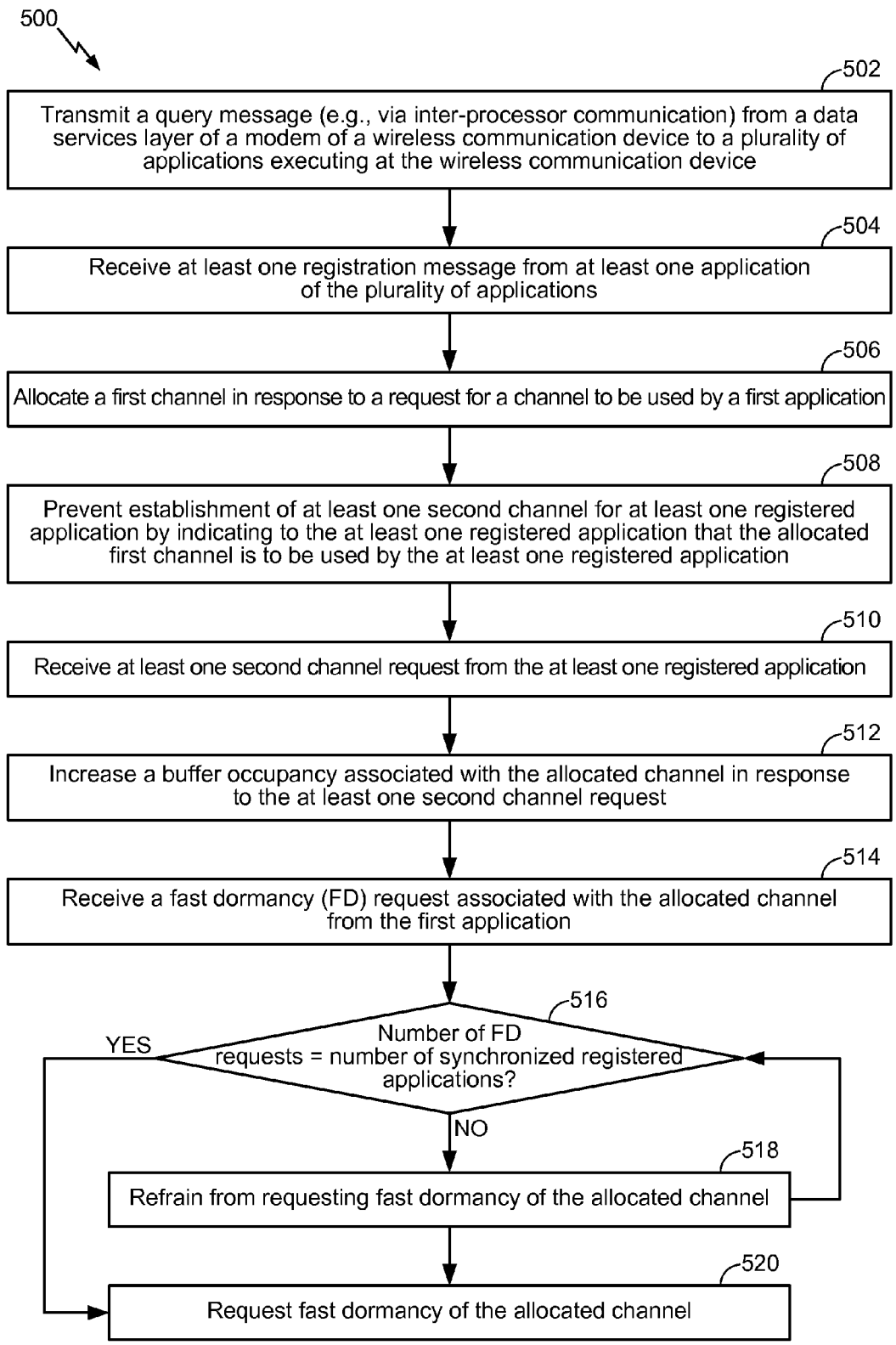
FIG. 5 is a flowchart to illustrate a particular embodiment of a method of requesting fast dormancy based on synchronized use of a wireless channel.

FIG. 5 is a flowchart to illustrate a particular embodiment of a method 500 of requesting fast dormancy based on synchronized use of a wireless channel by multiple applications executing at a wireless communication device. In an illustrative embodiment, the method 500 may be performed by the wireless communication device 102 of FIG. 1 or FIG. 3.

The method 500 may include transmitting a query message from a data services layer of a modem of a wireless communication device to a plurality of applications executing at the wireless communication device, at 502. In a particular embodiment, the query message may be transmitted via an inter-processor communication. For example, in FIG. 1, the data services layer 111 may transmit the registration query message 131 to the applications 121-124. The method 500 may also include receiving at least one registration message from at least one application of the plurality of applications, at 504. For example, in FIG. 1, the modem processor 110 may receive the registration message 132 from the calendar application 123.

The method 500 may further include allocating a first channel in response to a request for a channel to be used by a first application, at 506. For example, in FIG. 1, the modem processor 110 may allocate and/or request allocation of the channel 140 in response to the channel request 133 received from the first e-mail application 121. The method 500 may include preventing establishment of at least one second channel for at least one registered application by indicating to the at least one registered application that the allocated channel (i.e., the first channel) is to be used by the at least one registered application, at 508. For example, in FIG. 1, the modem processor 110 may prevent establishment of a second channel by transmitting the indication 134 to the calendar application 123.

The method 500 may also include receiving at least one second channel request from the at least one registered application, at 510. For example, in FIG. 1, the modem processor 110 may receive a second channel request 133 from the calendar application 123 in response to the indication 134. The second channel request 133 from the calendar application 123 may indicate that the calendar application 123 has elected to perform synchronized use of the allocated channel 140 with the first e-mail application 121. The method 500 may further include increasing a buffer occupancy associated with the allocated channel in response to the at least one second channel request, at 512. For example, in FIG. 1, the modem processor 110 may increase a buffer occupancy associated with the allocated channel 140 (e.g., including increasing the size of the buffers 114 and/or corresponding network-side buffers). In a particular embodiment, the MAC layer 112 may multiplex data from the first e-mail application 121 and the calendar application 123 onto the allocated channel 140 (e.g., via uplink buffer(s) 114) and may de-multiplex data from the allocated channel 140 (e.g., via the downlink buffer(s) 114) to the first e-mail application 121 and the calendar application 123. In addition, although the single allocated channel 140 is described for illustration, it should be noted that the allocated channel 140 may have multiple underlying logical, physical, and transport channels that are uplink-only, downlink-only, or both uplink and downlink.

The method 500 may include receiving a fast dormancy request associated with the allocated channel from the first application, at 514, and determining whether a number of received fast dormancy requests is equal to a number of applications performing synchronized use of the allocated channel, at 516. For example, with reference to FIG. 3, the fast dormancy logic 315 may receive the fast dormancy request 336 from the first e-mail application 121 and may determine whether the number of received fast dormancy requests 336 is equal to the number of applications performing synchronized use of the allocated channel 140.

When the number of received fast dormancy requests is not equal to the number of applications, the method 500 may include refraining from requesting fast dormancy of the allocated channel, at 518. For example, in FIG. 3, if two applications (e.g., the first e-mail application 121 and the calendar application 123) are engaging in synchronized use of the allocated channel 140 but only one fast dormancy request has been received (e.g., from the first e-mail application 121), then the fast dormancy logic 315 may refrain from requesting fast dormancy of the allocated channel 140, such as by not sending the fast dormancy request message 360.

When the number of received fast dormancy requests is equal to the number of applications (or when it is otherwise determined that fast dormancy is permitted), the method 500 may include requesting fast dormancy of the allocated channel, at 520. For example, in FIG. 3, after the calendar application 123 also transmits a fast dormancy request 336, the fast dormancy logic 315 may transmit the fast dormancy request message 360 to the network. If the fast dormancy request message 360 is honored, the modem processor 110 may receive a corresponding state transition message 370, which may enable the wireless communication device 102 to quickly transition into an IDLE state.

The method 500 of FIG. 5 may thus enable the use of fast dormancy in conjunction with synchronized use of an allocated channel, which may further reduce battery consumption at a wireless communication device and signaling congestion between the wireless communication device and a network.

In a particular embodiment, the method 500 of FIG. 5 may be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the method 500 of FIG. 5 can be performed by a processor that executes instructions, as described with respect to FIG. 7.

Figure 6:
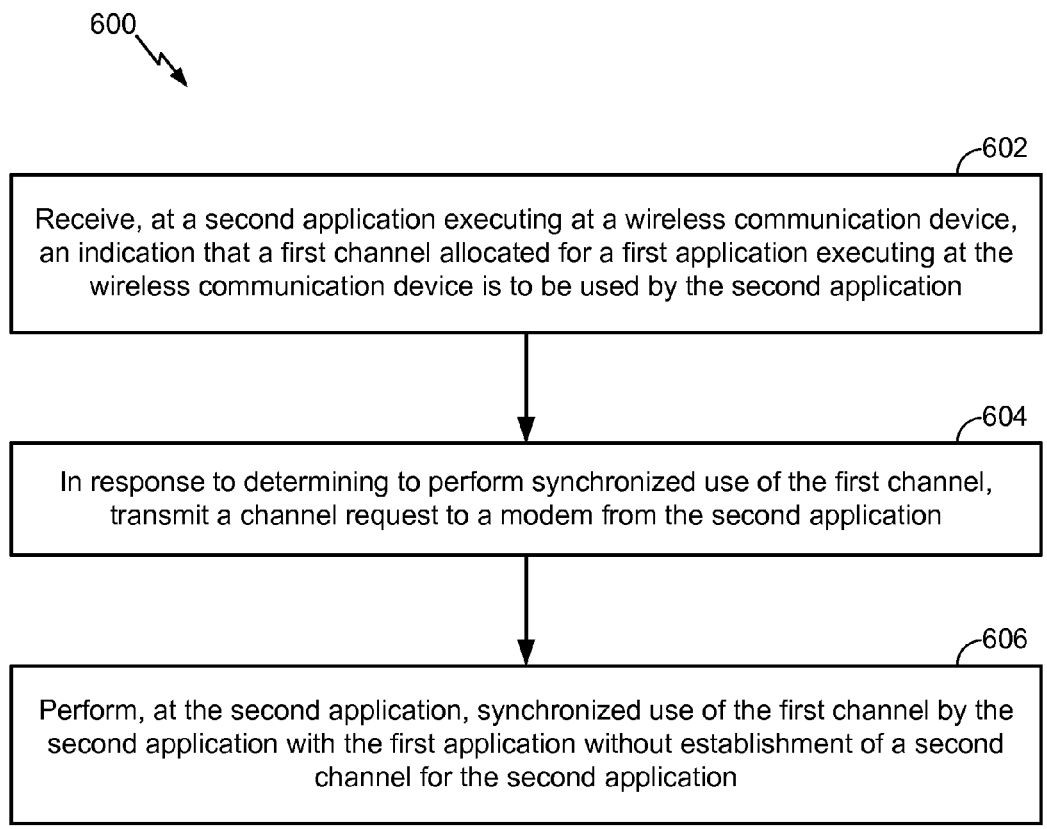
FIG. 6 is a flowchart to illustrate a particular embodiment of a method of performing synchronized use of a wireless channel.

FIG. 6 is a flowchart to illustrate a particular embodiment of a method 600 of performing, at a second application executing at a wireless communication device, synchronized use of a wireless channel with a first application executing at the wireless communication device. In an illustrative embodiment, the method 600 may be performed by any one or more of the applications 121-124 of FIGS. 1-3.

The method 600 may include receiving, at a second application executing at a wireless communication device, an indication that a first channel allocated for a first application executing at the wireless communication device is to be used (or is available for use) by the second application, at 602. For example, in FIG. 1, the calendar application 123 may receive the indication 134 that the channel 140 allocated for the first e-mail application 121 is to be used (or is available for use) by the calendar application 123.

The method 600 may also include, in response to determining to perform synchronized use of the first channel, transmitting a channel request to a modem (i.e., modem processor) from the second application, at 604. For example, in FIG. 1, the calendar application 123 may transmit a channel request 133 to the modem processor 110 in response to determining to perform synchronized use of the channel 140. In a particular embodiment, the calendar application 123 may make the determination responsive to determining that the calendar application 123 has a data synchronization operation scheduled within a defined time period (e.g., within the next five minutes, as described with reference to FIG. 2).

The method 600 may further include performing, at the second application, synchronized use of the first channel by the second application with the first application without establishment of a second channel for the second application, at 606. By performing synchronized use of the first channel with the first application at an earlier point in time, the second application may prevent establishment of a second channel for the second application at a later point in time. For example, in FIG. 1, the calendar application 123 may perform synchronized use of the allocated channel 140 with the first e-mail application 121 (e.g., by sending and/or receiving data via the allocated channel 140).

The method 600 of FIG. 6 may thus enable an application executing at a wireless communication device to determine whether or not to perform synchronized use of a wireless channel with one or more other applications executing at the wireless communication device. When multiple applications use a single allocated channel, signaling congestion between the wireless communication device and the network may be reduced and less power may be consumed at the wireless communication device.

Figure 7:
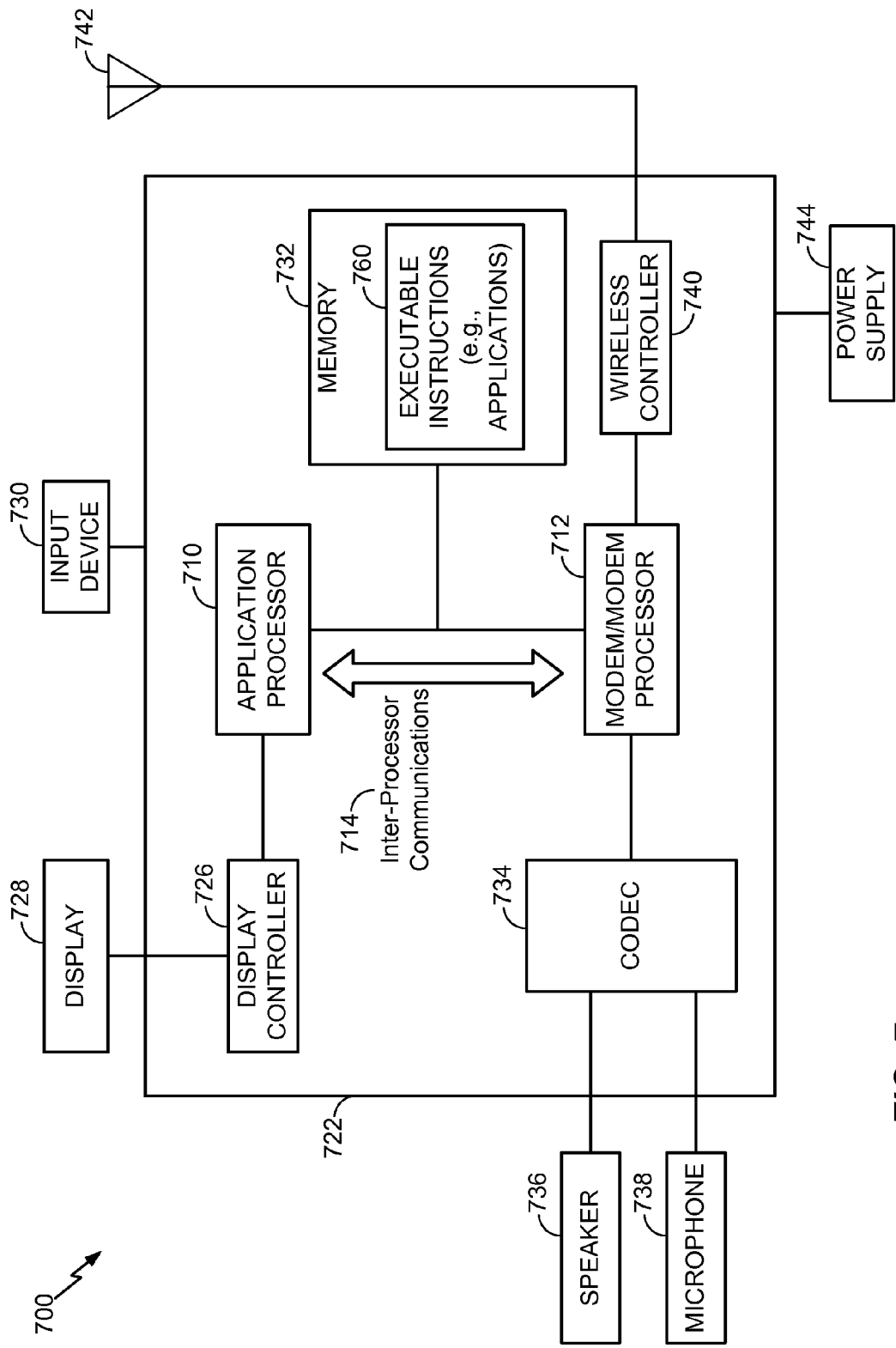
FIG. 7 is a block diagram of a wireless device including a system to enable synchronized use of a wireless channel between applications executing at the wireless device.

In a particular embodiment, the method 600 of FIG. 6 may be implemented via instructions stored in a memory and executable by a processing unit, such as the application processor 120 of FIGS. 1 and 3 or the application processor 710 of FIG. 7.

Referring to FIG. 7, a block diagram of a particular illustrative embodiment of a wireless communication device is depicted and generally designated 700. The device 700 includes the application processor 710 and a modem processor 712 coupled to a memory 732. The memory 732 may store instructions 760 that are executable by the application processor 710 and/or the modem processor 712. For example, the instructions 760 may represent one or more of the applications 121-124 of FIGS. 1-3. The application processor 710 and the modem processor 712 may communicate via inter-processor communications 714. For example, the inter-processor communications 714 may include the registration query 131, the registration messages 132, the channel requests 133, the indications 134, the incoming data 135, and the outgoing data 136 of FIG. 1 and the fast dormancy requests 336 of FIG. 3.

FIG. 7 also shows a display controller 726 that is coupled to the application processor 710 and to a display 728. A coder/decoder (CODEC) 734 can be coupled to the modem processor 712. A speaker 736 and a microphone 738 can be coupled to the CODEC 734.

FIG. 7 also indicates that a wireless controller 740 can be coupled to the modem processor 712 and to a wireless antenna 742. In a particular embodiment, the processors 710-712, the display controller 726, the memory 732, the CODEC 734, and the wireless controller 740 are included in a system-in-package or system-on-chip device 722. In a particular embodiment, an input device 730 and a power supply 744 are coupled to the system-on-chip device 722. Moreover, in a particular embodiment, as illustrated in FIG. 7, the display 728, the input device 730, the speaker 736, the microphone 738, the wireless antenna 742, and the power supply 744 are external to the system-on-chip device 722. However, each of the display 728, the input device 730, the speaker 736, the microphone 738, the wireless antenna 742, and the power supply 744 can be coupled to a component of the system-on-chip device 722, such as an interface or a controller.

In conjunction with the described embodiments, an apparatus is disclosed that includes means for executing a first application. For example, the means for executing the first application may include the application processor 120 of FIGS. 1 and 3, the application processor 710 of FIG. 7, one or more other devices, circuits, or modules to execute a first application, or any combination thereof. The apparatus also includes means for executing a second application. For example, the means for executing the second application may include the application processor 120 of FIGS. 1 and 3, the application processor 710 of FIG. 7, one or more other devices, circuits, or modules to execute a second application, or any combination thereof. In a particular embodiment, the means for executing the first application and the means for executing the second application may correspond to the same processor or device. Alternately, the means for executing the first application and the means for executing the second application may correspond to different processors or devices The apparatus further includes means for allocating a first channel in response to a first channel request for a channel to be used by the first application. For example, the means for allocating may include the modem processor 110 of FIGS. 1-3 or component(s) thereof, the base station 104 of FIGS. 1-3, the modem processor 712 of FIG. 7, one or more other devices, circuits, or modules to allocate a channel, or any combination thereof. The apparatus includes means for preventing establishment of a second channel for the second application, including means for indicating to the second application that the allocated channel is to be used by the second application. For example, the means for preventing and the means for indicating may include the modem processor 110 of FIGS. 1-3 or component(s) thereof, the modem processor 712 of FIG. 7, one or more other devices, circuits, or modules to prevent establishment of a channel and indicating that an allocated channel is to be used (or is available for use), or any combination thereof.

The apparatus may also include means for transmitting a query message to the second application. For example, the means for transmitting may include the modem processor 110 of FIGS. 1-3 or component(s) thereof, the modem processor 712 of FIG. 7, one or more other devices, circuits, or modules to transmit a query message, or any combination thereof. The apparatus may further include means for receiving a registration message from the second application in response to the query message. For example, the means for receiving may include the modem processor 110 of FIGS. 1-3 or component(s) thereof, the modem processor 712 of FIG. 7, one or more other devices, circuits, or modules to receive a registration message, or any combination thereof.

Those of skill would further appreciate that the various illustrative logical blocks, configurations, modules, circuits, and steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal (e.g., a mobile phone or a PDA). In the alternative, the processor and the storage medium may reside as discrete components in a computing device or user terminal The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method comprising:
    allocating a first channel of a wireless communication device in response to a request for a channel to be used by a first application executing at the wireless communication device; and
    transmitting an indication that the first channel is to be used by a second application executing at the wireless communication device, instead of establishing a second channel, wherein the indication is transmitted from a modem of the wireless communication device to the second application.

2. The method of claim 1, further comprising receiving a second request for the channel corresponding to a scheduled network activity from the second application, wherein the second request is received before a scheduled time associated with the scheduled network activity.

3. The method of claim 1, further comprising receiving a second channel request from the second application.

4. The method of claim 3, further comprising increasing a buffer occupancy associated with the first channel in response to the second channel request.

5. The method of claim 1, wherein the first application comprises a first background application executing at the wireless communication device and wherein the second application comprises a second background application executing at the wireless communication device.

6. The method of claim 1, wherein execution of the first application includes executing a first operation associated with a first scheduled data synchronization operation and wherein execution of the second application includes executing a second operation associated with a second scheduled data synchronization operation.

7. The method of claim 6, wherein the first and second scheduled data synchronization operations occur within a defined time period.

8. The method of claim 6, wherein the second scheduled data synchronization operation is scheduled to occur after the first scheduled data synchronization operation.

9. The method of claim 6, wherein a second channel request is received prior to an occurrence of the second scheduled data synchronization operation.

10. The method of claim 1, wherein the first application and the second application each communicate via the first channel prior to a release of the channel.

11. The method of claim 1, wherein the modem is in an IDLE state or a paging channel (PCH) state prior to receiving the request for the channel, wherein the modem transitions to a forward access channel (FACH) state or a dedicated channel (DCH) state while the first channel is allocated, and wherein the modem transitions to the IDLE state or the PCH state after a release of the first channel.

12. The method of claim 1, further comprising:
    transmitting a registration query message from a data services layer of the modem to a plurality of applications executing at the wireless communication device;
    receiving at least one registration message from at least one application of the plurality of applications; and
    sending a second indication to at least one registered application that the first channel is to be used by the at least one registered application.

13. The method of claim 1, wherein transmitting the indication includes transmitting an inter-processor communication from the modem to at least one application processor that is executing the second application.

14. The method of claim 1, further comprising:
    receiving, at the modem of the wireless communication device, a first dormancy request from the first application, wherein the first dormancy request is associated with the first channel; and
    refraining from requesting fast dormancy of the first channel until determining that a number of received dormancy requests associated with the first channel is equal to a number of applications associated with synchronized use of the channel.

15. The method of claim 1, wherein the first channel comprises a universal mobile telecommunications system (UMTS) logical channel, a UMTS transport channel, a UMTS physical channel, or any combination thereof.

16. The method of claim 1, wherein the modem comprises a medium access control (MAC) layer configured to multiplex data from the first application and the second application to the first channel and de-multiplex data from the first channel to the first application and the second application.

17. A wireless communication device comprising:
    an application processor configured to execute at least a first application and a second application; and
    a modem processor configured to:
        allocate a first channel in response to a request for a channel to be used by the first application; and
        transmit an indication that the first channel is to be used by the second application instead of establishing a second channel.

18. The wireless communication device of claim 17, wherein the modem processor is configured to transmit an inter-processor communication to the application processor.

19. The wireless communication device of claim 17, wherein the modem processor is further configured to:
    transmit a registration query message to the second application; and
    receive a registration message from the second application in response to the registration query message.

20. A wireless communication device, comprising:
  means for executing a first application;
  means for executing a second application;
  means for allocating a first channel in response to a first channel request for a channel to be used by the first application; and
  means for transmitting an indication that the first channel is to be used by the second application instead of establishing a second channel.

21. The wireless communication device of claim 20, further comprising:
  means for transmitting a registration query message to the second application; and
  means for receiving a registration message from the second application in response to the registration query message.

22. A non-transitory processor-readable medium comprising instructions that, when executed by a processor, cause the processor to:
  receive, at a second application executing at a wireless communication device, an indication, from a modem of the wireless communication device, that a first channel allocated for a first application executing at the wireless communication device is to be used by the second application;
  in response to determining to perform synchronized use of the first channel, transmit a channel request to the modem from the second application; and
  perform, at the second application, synchronized use of the first channel with the first application without establishment of a second channel for the second application.

23. The non-transitory processor-readable medium of claim 22, further comprising instructions that, when executed by the processor, cause the processor to:
  receive a registration query message at the second application from the modem; and
  transmit a registration message from the second application to the modem in response to the registration query message.

* * * * *